United States Patent [19]

Manzoni

[11] Patent Number: 4,674,013
[45] Date of Patent: Jun. 16, 1987

[54] DEVICE FOR ADJUSTING THE POSITION OF VEHICLE HEADLAMPS

[75] Inventor: Stéphane Manzoni, Saint Claude, France

[73] Assignee: Manzoni-Bouchot, France

[21] Appl. No.: 753,696

[22] Filed: Jul. 10, 1985

[30] Foreign Application Priority Data

Aug. 1, 1984 [FR] France .................. 84 12212

[51] Int. Cl.⁴ .................... F21V 3/18; B60Q 1/06
[52] U.S. Cl. ......................... 362/66; 362/272; 362/273; 362/421; 362/428
[58] Field of Search .............. 362/66, 69, 70, 80, 362/269, 273, 285, 289, 427, 428, 61, 71, 420, 423, 39, 421, 422, 419, 272

[56] References Cited

U.S. PATENT DOCUMENTS

| 3,634,677 | 1/1972 | Wolffing-Seelig | 362/71 |
|---|---|---|---|
| 4,196,459 | 4/1980 | Dick | 362/66 |
| 4,204,270 | 5/1980 | Porrier d'Ange d'Orsay | 362/71 |
| 4,574,334 | 3/1986 | Igura | 362/66 |
| 4,599,681 | 7/1986 | McMahan et al. | 362/80 |

FOREIGN PATENT DOCUMENTS

| 1780341 | 12/1971 | Fed. Rep. of Germany | 362/71 |
|---|---|---|---|
| 1806312 | 4/1980 | Fed. Rep. of Germany | 362/272 |
| 167345 | 9/1984 | Japan | 362/66 |

Primary Examiner—William A. Cuchlinski, Jr.
Assistant Examiner—D. M. Cox
Attorney, Agent, or Firm—Remy J. VanOphem

[57] ABSTRACT

A device for adjusting the position of the headlamps of a vehicle both in azimuth and in elevation, the headlamp having a swivel joint at one end by which it is adapted to be mounted to the bodywork of the vehicle. The headlamp is connected to a mobile element by two pins at the other end of the headlamp, one of the pins lying on the horizontal axis of the headlamp and the other being offset with respect to the horizontal axis. The mobile element is mounted to slide horizontally on a support member fixed on the bodywork, and there is provided an adjusting device between the support member and the mobile element for adjusting the mobile element in azimuth. There is also provided a device for adjusting the mobile element in elevation, and this device is selectively adjustable either manually or by a drive member, this device for adjusting the mobile element in elevation acting on the pin that is offset with respect to the horizontal axis to drive the headlamp about the horizontal axis.

12 Claims, 14 Drawing Figures

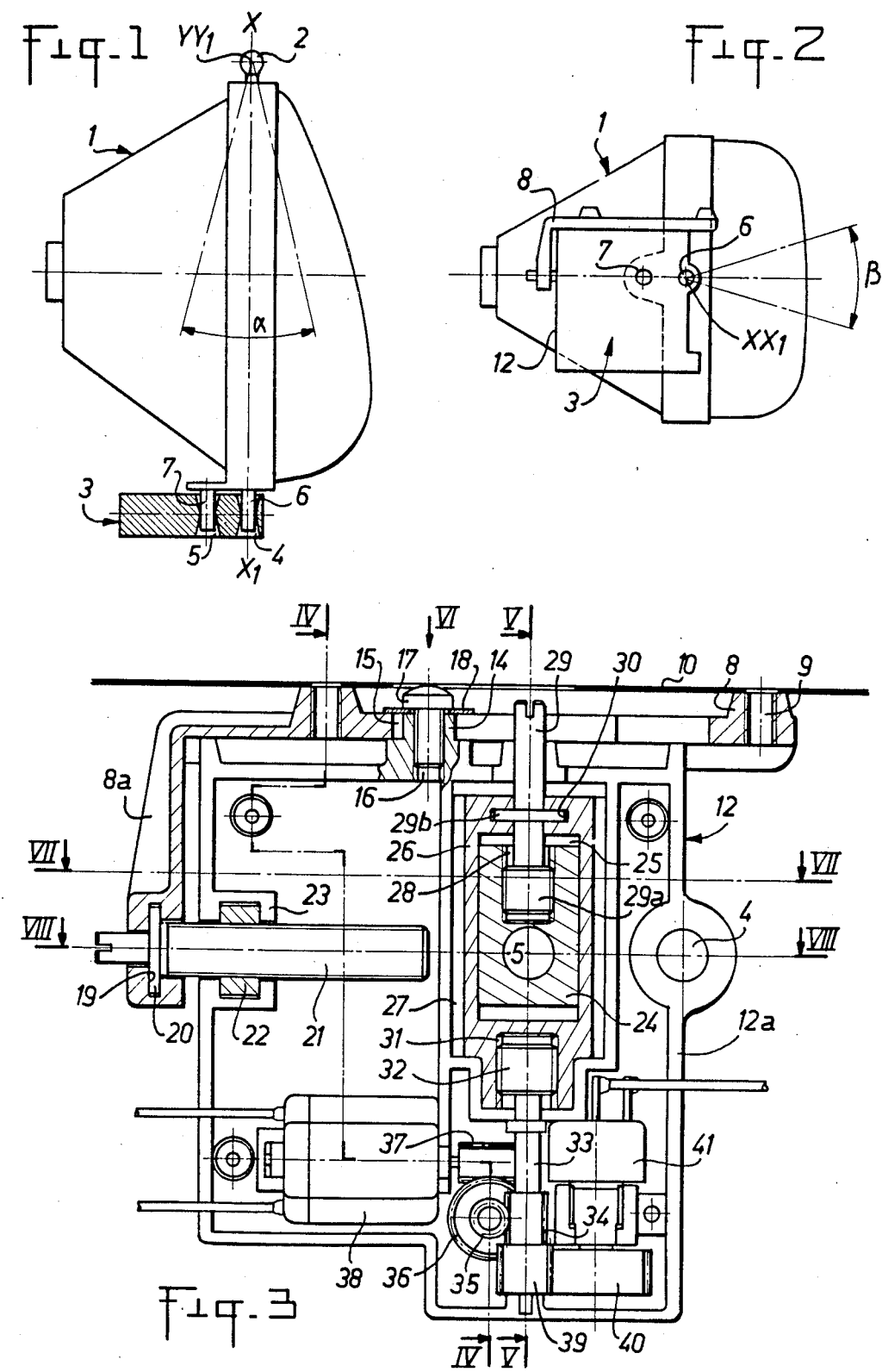

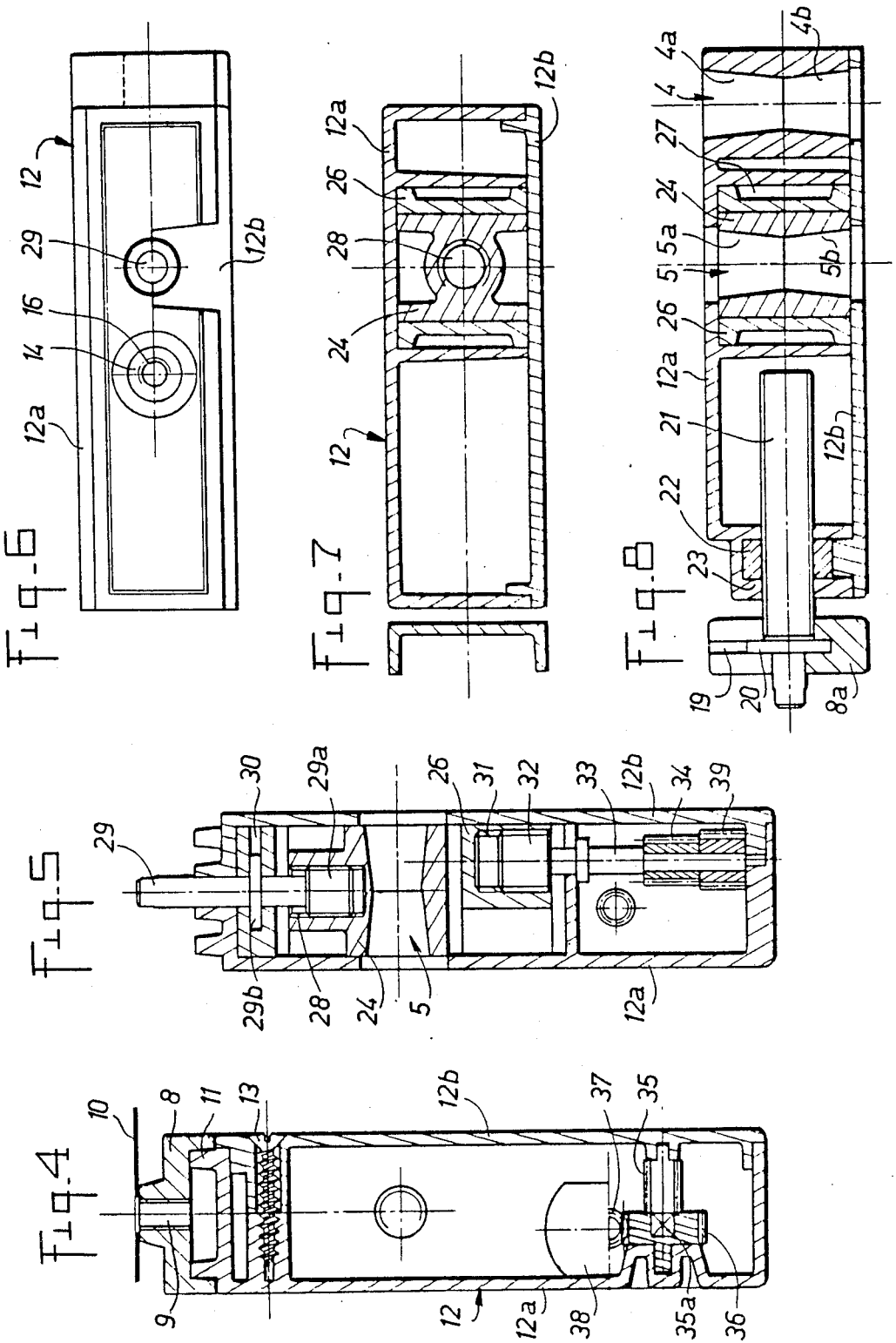

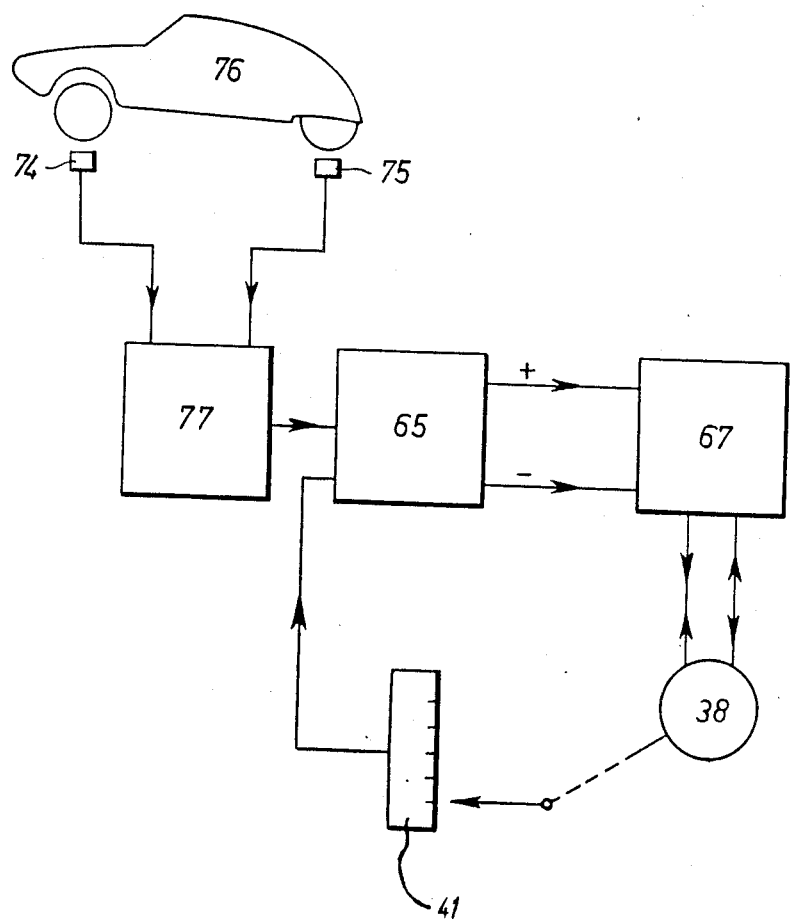

DEVICE FOR ADJUSTING THE POSITION OF VEHICLE HEADLAMPS

BACKGROUND OF THE INVENTION

1. Field of the Invention

The present invention relates to an apparatus for adjusting the position of vehicle headlamps.

2. Description of Prior Art

As is known in the prior art, there are devices to enable the driver of a vehicle to adjust the position of the headlamps of the vehicle while the driver is positioned in the driver's seat. There is also a prior art device that includes screws which are returned by springs for adjusting the position of the headlamps of a vehicle both in azimuth and in elevation. However, none of these devices permits both the initial adjustment of the low or dipped beam and the remote control by the driver of the inclination in elevation of the low beam while at the same time being simple in construction.

SUMMARY OF THE INVENTION

It is an object of the present invention to provide an improved device for adjusting vehicle headlamps.

In accordance with the present invention, each headlamp has a swivel joint at one of the ends of its horizontal axis. The headlamp is mounted on the bodywork of the vehicle by this swivel joint. At its other end, the headlamp is mounted on a mobile element by means of two pivoting pins one of which lies in the horizontal axis and the other of which is offset with respect to the horizontal axis, the mobile element being mounted to slide horizontally on a support member that is fixed on the bodywork of the vehicle. A device for manually adjusting in azimuth is provided between the mobile element and the support member, the mobile element also having a device for adjustment in elevation which is controlled selectively by a manual member or a drive member, the device for adjustment in elevation driving the offset pin and the headlamp in rotation about its horizontal axis.

The apparatus according to the invention takes the form of a compact assembly for each headlamp which simplifies its assembly on the vehicle. It makes it possible on the one hand to simplify the initial manual adjustment of the low or dipped beam when the vehicle is empty, at the end of the maufacturing process and, on the other hand, enables the driver to adjust the position in elevation of the headlamps, as a function of the load of the vehicle, from the driver's seat.

The arrangement according to the invention makes it possible to adjust the positions of the headlamp in azimuth and in elevation independently of each other, whereas, in the prior art devices, and depending on the arrangement of the adjusting screws, the adjustment of one position may bring about the misadjustment of the other.

The invention permits the two headlamp drive mechanisms to be independently adjusted with the result that, if one motor rotates more quickly than the other, it stops when it reaches the predetermined position, while the other continues to operate until the other headlamp reaches the same position.

Each headlamp drive mechanism is equipped with a safety circuit so that, if adjustment were impossible, although the mechanism is supplied with power, a safety circuit would cut off this supply of power to allow the other mechanism to operate.

The invention will be more readily understood on reading the following description with reference to the accompanying drawings.

BRIEF DESCRIPTION OF THE DRAWINGS

FIG. 1 is a plan view of a vehicle headlamp and the apparatus according to the present invention for adjusting it;

FIG. 2 is an elevational view of a headlamp and of the apparatus according to the invention for adjusting it;

FIG. 3 is a view in longitudinal section of the headlamp adjusting device;

FIG. 4 is a view in section taken along line IV—IV of FIG. 3;

FIG. 5 is a view in section taken along line V—V of FIG. 3;

FIG. 6 is a plan view of the device in the direction of arrow VI in FIG. 3;

FIG. 7 is a view in section taken along line VII—VII of FIG. 3;

FIG. 8 is a view in section taken along line VIII—VIII of FIG. 3;

FIG. 13 is a diagram of an electronic circuit for supplying the motor, such electronic circuit including sensors for sensing the position of the bodywork of the vehicle.

DETAILED DESCRIPTION OF THE PREFERRED EMBODIMENT

Figure 9:
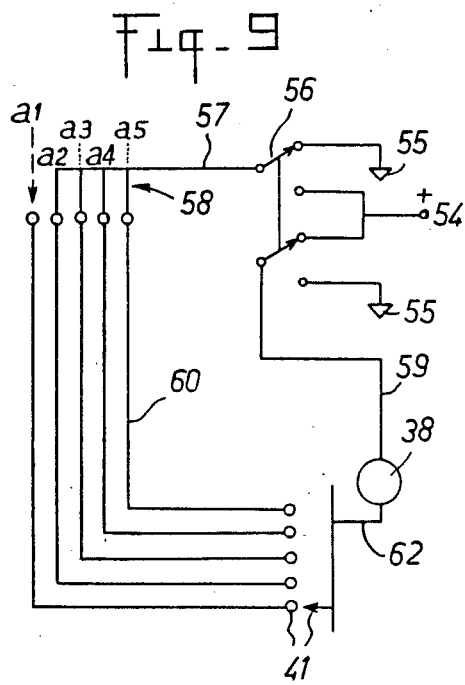
FIG. 9 is a diagram of a circuit for supplying the control motor.

Referring now to the drawings, FIGS. 1 and 2 show a headlamp 1 of an automobile vehicle (not shown) which is mounted on the bodywork (also not shown) of a vehicle by a swivel joint 2 located at one of the ends of the horizontal axis $XX_1$ of the headlamp and by an adjusting device 3 for adjusting the position of the headlamp located at the other end of the horizontal axis $XX_1$. This arrangement is intended to allow an adjustment of the position of the headlamp 1 in azimuth through an angle $\alpha$ by rotation about a vertical axis $YY_1$ and in elevation about a horizontal axis $XX_1$ through an angle $\beta$.

The adjusting device 3 (FIGS. 1 and 2) has two holes 4 and 5 in which are, respectively, engaged a pin or finger 6 which lies along the horizontal axis $XX_1$ in line therewith and a pin or finger 7 which is offset with respect to the axis $XX_1$.

The adjusting device 3 has a support member 8 with tapped holes 9 therein. Screws (not shown) are engaged in the tapped holes 9 to ensure fixation of the adjusting device 3 to an element 10 of the bodywork (FIGS. 3 and 4). The support member 8 has a groove 11 and a mobile element 12 that includes a box 12a which is closed by a lid 12b that is attached by means of screws 13 to the box 12a which is slidably mounted in the groove 11.

The mobile element 12 has a boss 14 at the upper portion thereof and the boss 14 is mounted to slide in a slot 15 which is provided in the support member 8, the boss 14 having a tapped hole 16. A screw 17 with a washer 18 in abutment against the edges of the slot 15 is engaged in the tapped hole 16. In this way, the mobile element 12 is maintained in the groove 11 on the support member 8 and it may slide horizontally with respect to the support member 8.

The support member 8 has an arm 8a and a housing 19 is provided on the arm 8a. A screw 21 has a flange 20 which is rotatably trapped in the arm 8a and the screw 21 has a threaded part which is engaged in a nut 22 which is non-rotatably trapped in rotation in a housing 23 in the box 12a. The screw 21 has its axis parallel to the direction of slide of the mobile element 12 with respect to the support member 8, and this makes it possible, by the rotation of the screw 21, to obtain axial and horizontal displacement of the mobile element 12 with respect to the support member 8.

The hole 4 for receiving the finger 6 is located in the wall of the box 12a, while the other hole 5 for receiving the finger 7 is located in a second slide block 24 which is mounted to slide vertically in a housing 25 in a first slide block 26, the first slide block 26 itself being mounted to slide vertically in a guide 27 made in the box 12a (FIGS. 3, 5, 7, and 8).

The second slide block 24 has a tapped hole 28, and a threaded part 29a of a screw 29 is engaged in the tapped hole 28 and is provided with a flange 29b. The flange 29b is rotatably trapped in a housing 30 in the first slide block 26. At its base, the first slide block 26 has a tapped hole 31, and a threaded part 32 of a shaft 33 is received in the tapped hole 31 and is driven in rotation by a drive member.

To this end, the shaft 33 bears a pinion 34 which meshes with a pinion 35 that is retained by a square member 35a and the pinion 35 is driven by a tangential wheel 36 which meshes with an endless screw 37 mounted at the end of a shaft of an electric motor 38.

Similarly, the shaft 33 is also fitted with a pinion 39 which meshes with a pinion 40 mounted on the drive shaft of a potentiometer 41 that senses the position of the headlamp.

The holes 4 and 5 that engage the fingers 6 and 7 of the headlamp each have two truncated parts 4a, 4b, and 5a, 5b, respectively, in order to allow clearance of the fingers 6 and 7 during displacement of the headlamp 1 in rotation.

The device for adjusting the position of the headlamps operates as follows: when the vehicle is used for the first time, or on the occasion of annual servicings, the headlamp is manually adjusted in azimuth through angle α FIG. 1) by operation of the screw 21, which causes the mobile element 12 to slide with respect to the support member 8 (FIG. 3). The locking screw 17 was previously loosened to allow displacement of the mobile element 12 which drives the two fingers 6 and 7 and which is translated by a rotation of the handlamp 1 about axis $YY_1$, i.e., in azimuth through angle α. When the adjustment has been made, the screw 17 is tightened in order to prevent any subsequent misadjustment of the headlamp.

To proceed with manual adjustment of the headlamp in elevation through angle β (FIG. 2), the screw 29 is turned so that the threaded part 29a of the screw 29 which is fixed with respect to the first slide block 26 causes the vertical displacement of the second slide block 24 and consequently that of the finger 7 which results in the pivoting of the handlamp 1 about the horizontal axis $XX_1$ through an angle β.

When the driver wishes to modify the angle of elevation β because of a variation in load of the vehicle, he acts on a member of a supply circuit for the motor 38 which will be described hereinafter. To this end, the motor 38 is supplied to be driven in one direction or in the other and this ensures the rotation of the shaft 33, by the screw 37, the tangential wheel 36 and the pinions 35 and 34 which leads to rotation of the threaded part 32 in the tapped hole 31 and the vertical slide of the first slide block 26 in the guide 27. As the second slide block 24 is secured to the first slide block 26, it is also driven vertically, thus, resulting in pivoting of the headlamp 1 about the horizontal axis $XX_1$ through an angle of elevation β.

As the mechanism that has been described hereinabove has been described in relationship to one headlamp only, the supply circuit is shown with one motor 38 and one position sensing potentiometer per headlamp in order to facilitate understanding of the present invention. In fact, two motors 38 are mounted in parallel (one motor per headlamp), each with its own position sensing potentiometer, which allows an identical adjustment of the two headlamps even if one of the servo-control motors rotates more quickly than the other.

FIG. 9 shows a supply circuit which includes a source of current of which the positive and negative terminals 54 and 55 are connected selectively via an inverter 56 to one of the terminals of the motor 38 by a lead 59 and to the other terminal of the motor 38 by a lead 57, a control selector 58, one of the leads 60, the headlamp position sensing potentiometer 41 and a common lead 62. The control selector 58 is connected by five leads 60 to the potentiometer 41 which itself is connected by its common lead 62 (area of displacement of the headlamp) to the motor 38.

The control selector 58 is located within reach of the driver and it may be rotary or linear; it controls a power contact switching, as well as an indication as to the direction of displacement by a sort of mechanical memory acting as a polarity inverter at the terminals of the motor.

The inverter 56 is controlled by the control selector 58, so that the control selector 58 brings about a displacement of the headlamp monitored by the potentionmeter 41. In position $a_1$ shown in FIG. 9, the motor 38 is not operating, the headlamp being in position of equilibrium on the position $a_1$ of non-supply.

Figure 10:
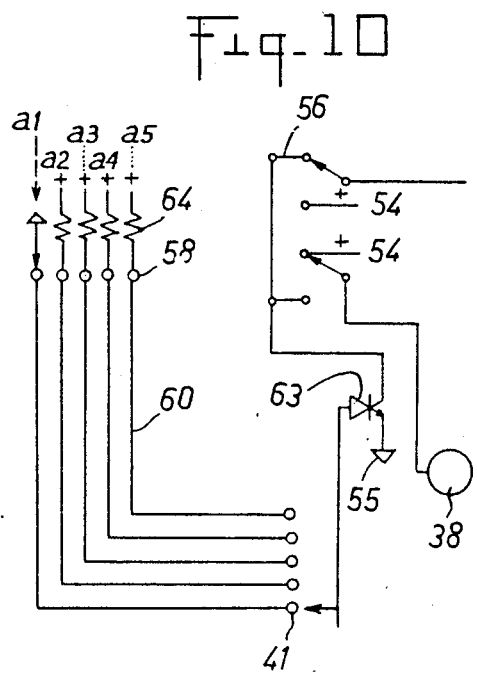
FIG. 10 is a diagram of an analog electronic circuit for supplying the motor.

The supply circuit shown in FIG. 10 is identical to that of FIG. 9 except as regards the link between the motor 38 and the potentiometer 41 which includes an electronic switch 63 incorporating a transistor. This arrangement overcomes the drawbacks of the break arc and makes it possible to separate the functions of controlling the motor and of monitoring the position by the electronic switch 63 which causes a minimum current to pass in the position sensing potentiometer 41.

The switching of the motor is provided by the electronic switch 63 which switches the load towards the ground. A timing circuit 64 may be interposed between the position sensing potentiometer 41 and the control selector 58 of the motor 38.

Figure 11:
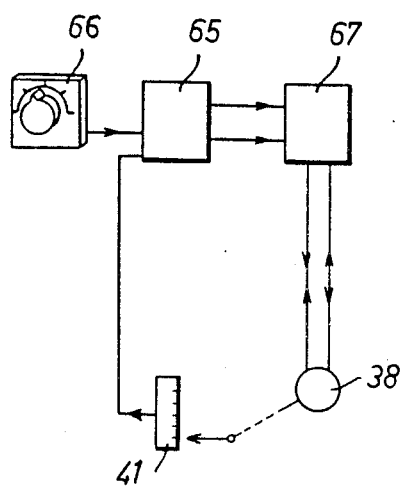
FIG. 11 is a diagram of an analog electronic circuit for supplying motor.

FIG. 11 shows another circuit for supplying the motor 38 which is of the electronic and analog type. This circuit has a manual control selector 66 which sends signals to a comparator 65 that also receives signals from a headlamp position sensing potentiometer 41, the comparator 65 furnishing a control unit 67 of the motor with signals as a function of the signals from the selector 66 and the potentiometer 41. These signals correspond to three states:

Balance: no output voltage.
A positive control signal.
A negative control signal.

The control unit 67, which receives these signals, effects therefrom the passage of the current in the motor by selecting its direction of rotation. This device is called an analog device, as the control selector 66 furnishes a voltage from the switching of the resistors and the position sensing potentiometer 41 furnishes an analog voltage.

Figure 12:
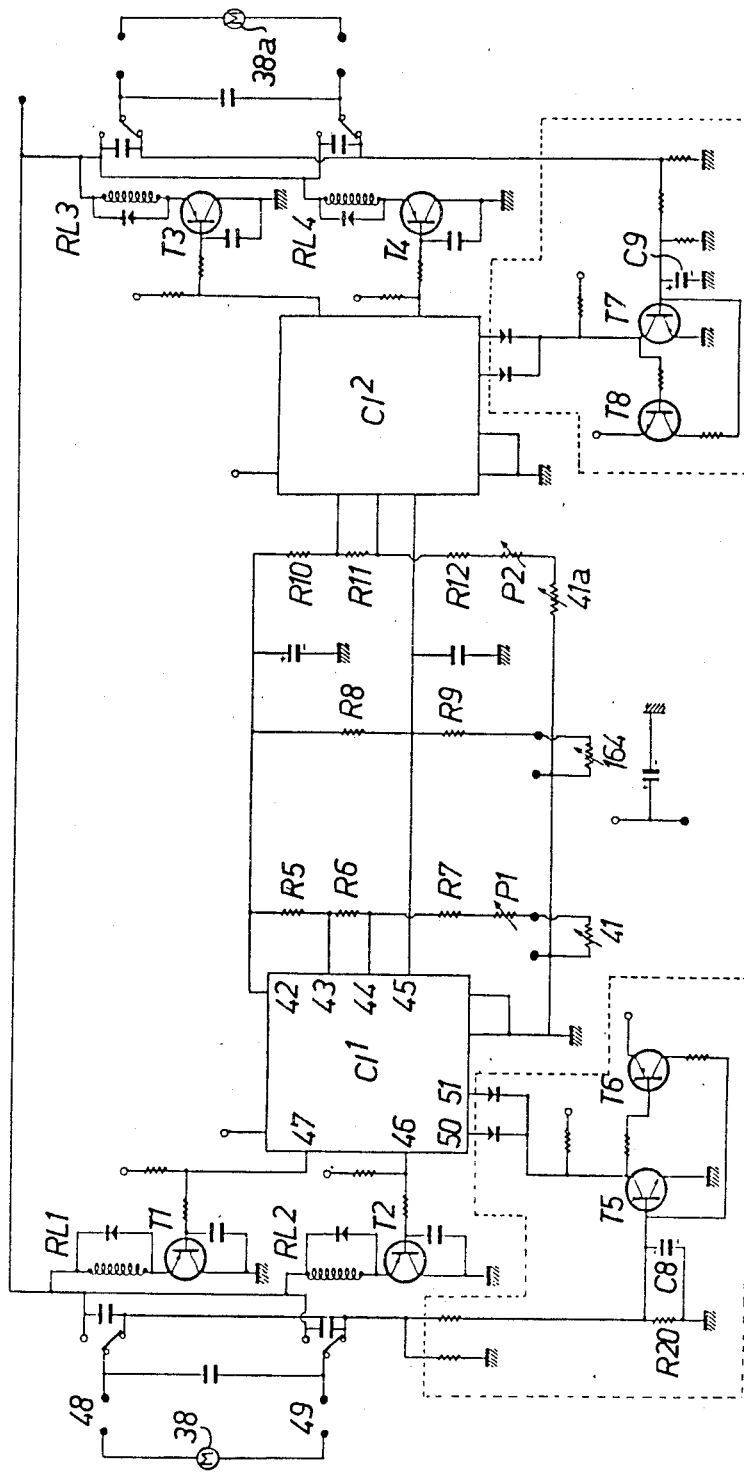
FIG. 12 is a detailed diagram of the electronic circuit shown in FIG. 10.

The detailed circuit of the above embodiment has been shown in FIG. 12 to ensure the adjustment of the two headlamps by means of motors 38 and 38a and position sensing potentiometers 41 and 41a. The device is constituted by two identical tracks to enable the two headlamps to be adjusted separately. These two tracks are controlled by the two integrated circuits CI1 and CI2. The reference potentiometer 164 is connected between the position sensing potentiometers 41 and 41a and it is common to the two tracks. The voltage reference for the measuring bridges is given by terminal 42 of circuit CI1.

In circuit CI1, resistors R5 and R8 constitute the reference arms and resistors R7 and R9 the variable arms which are connected in series with the position sensing potentiometer 41 and reference potentiometer 164.

In circuit CI2, resistors R10 and R8 constitute the reference arms and resistors R12 and R9 the variable arms which are connected with the position sensing potentiometer 41 and with the reference potentiometer 164.

Resistors R11 and R6 bring a hysteresis to the detection systems and potentiometer P1 and P2 enable the arms of the measuring bridges to be adjusted in the event of considerable dispersions of the resistances.

When an unbalance appears in the measuring bridge due to the displacement of the reference potentiometer 164, a reference current is produced at the terminals 43, 44, 45 of the integrated circuit CI1 so that a negative voltage appears on terminal 46 or on terminal 47 which supplies the bases of transistors T1 of T2.

Depending on the position of transistors T1 or T2, the latter allow supply of the coils of relays RL1 or RL2 of which the contact members ensure the closure of a supply circuit connected to the terminals 48 and 49 and supplying the motor 38 for a rotation in one direction or the other.

For motor 38a, operation of the circuit is identical.

When an anomaly occurs in the supply of the electronic circuit, the measuring bridge constituted by transistors T5 and T6 or T7 and T8 registers an unbalance which renders T5 or T7 conductive. Since the emitter of the transistor T5 or T7 is connected to ground, the result is that the inhibition input 50 and 51 of circuit CI1 or CI2 is connected to ground, which stops the device during the discharge of capacitor C8 or C9.

It is, therefore, necessary to wait a few seconds for the capacitor C8 or C9 to be discharged in order to re-supply the circuit.

FIG. 13 shows an electrical circuit for supplying the motor 38 which is identical to that of FIG. 11 except for the control selector which has been replaced by two sensors 74 and 75 sensing the position of the bodywork of the vehicle which are located, respectively, on the front and rear wheels of a vehicle 76 and transmit signals to a differential circuit 77 which calculates the position of the bodywork and furnishes the analog signal which was previously furnished by the control selector.

This arrangement makes it possible to control the deflection of the low light beam by the position of the bodywork with respect to the ground.

To avoid an oscillation of the system, care should be taken to dampen the effects of rapid variations in the profile of the highway by integrating a transmission timing in the signals coming from the wheels. On the other hand, a certain hysteresis is necessary in the circuit in order not to permanently modify the information if the adjustment lies between two positions.

In a more elaborate version, it is possible to make a proportional servomechanism over the whole extent of the adjustment depending no longer only on discrete positions of loading of the boot or the interior, but an adjustment depending on the acceleration or braking.

Figure 14:
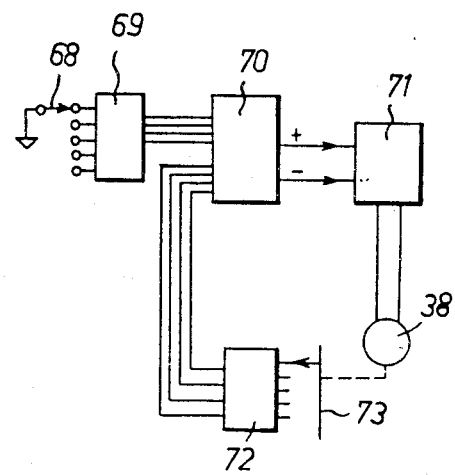
FIG. 14 is a diagram of a digital electronic circuit for supplying the motor.

FIG. 14 shows a supply circuit of the motor 38 which is electronic and digital. The circuit includes a manual control selector 68 of which the control knob selects a digital comparison code on the coder 69 which forms a word of 4 bits which is transmitted to a control card of the comparator 70 which also receives a digital word coming from another coder 72 connected to a sensor 73. The digital comparator 70 furnishes the positive and negative signals to the control circuit 71 which supplies the motor.

The invention is, of course, not limiting and one skilled in the art may make modifications thereto without departing from the field of the invention.

Having, thus, described the present invention by way of an exemplary embodiment, it will be apparent to those skilled in the art that many modifications may be made from the exemplary embodiment without departing from the spirit of the present invention or the scope of the claims appended thereto.

What is claimed is:

1. A device for adjusting the position in azimuth and in elevation of the headlamp for a vehicle having bodywork, said device comprising a support member adapted to be fixed on the bodywork, said headlamp having first and second ends, a horizontal and a swivel joint as one of the first and second ends by which the headlamp is mounted to the bodywork of the vehicle, two pins adjacent the other of the first and second ends of the headlamp, one of said two pins lying on the horizontal axis of the headlamp, the other of said two pins being offset with respect to the horizontal axis of the headlamp and generally parallel thereto, said device further comprising a mobile element which is adapted to pivotally receive said two pins of the headlamp, said mobile element being mounted to said support member to slide horizontally thereon, said device further comprising:

manual adjusting means for adjusting in azimuth said mobile element of said device relative to the bodywork of the vehicle, said manual adjusting means extending between said mobile element and the bodywork of the vehicle; and adjusting means for adjusting the headlamp in elevation by driving the other of said two pins and thereby the headlamp in an art about the horizontal axis, said adjusting means being selectively operable manually or automatically.

2. A device according to claim 1 wherein said mobile element is in the form of a box having a lid closing said box and further comprising:
- a first slide block, said first slide block being positioned within said mobile element and being slidable vertically therein; and
- a hole extending into said first slide block, said hole receiving the other of the two pins of the headlamp.

3. A device according to claim 2 wherein said slide block comprises:
- a housing, said housing comprising vertical slides therein; and
- a second first slide block, said second slide block being guided by said vertical slides in said housing of said first slide block, said second slide block comprising said hole; and
- wherein said adjusting means for adjusting the headlamp in elevation comprises a second screw and a second nut, said second screw being rotatable within said second nut, said second nut being secured to said second slide block, said second screw being fixed in translation with respect to said first slide block.

4. A device according to claim 2 and further comprising:
- a drive member;
- a transmission shaft, said transmission shaft being driven by said drive member and comprising a threaded portion; and
- a threaded hole in said first slide block, said threaded hole receiving said threaded portion of said transmission shaft.

5. A device according to claim 4 wherein said first slide block comprises:
- a housing, said housing comprising vertical slides therein; and
- a second slide block, said second slide block being guided by said vertical slides in said housing of said first slide block, said second slide block comprising said hole; and
- wherein said adjusting means for adjusting the headlamp in elevation comprises a second screw and a second nut, said second screw being rotatable within said second nut, said second nut being secured to said second slide block, said second screw being fixed in translation with respect to said first slide block.

6. A device according to claim 4 wherein said drive member comprises:
- an electrical motor; and
- a gear transmission connecting said electrical motor to said transmission shaft.

7. A device according to claim 6 wherein said transmission shaft has a pinion, and further comprising:
- a sensor for sensing the position in elevation of the headlamp, said sensor having a rotatable control shaft, said pinion of said transmission shaft engaging said rotatable control shaft of said sensor.

8. A device according to claim 7 wherein said sensor is a potentiometer.

9. A device according to claim 1 wherein said manual adjusting means comprises a screw and a nut, said screw being rotatable within said nut, said nut being secured to one of said mobile element and the bodywork of the vehicle, said screw being fixed in translation with respect to the other of said mobile element and the support member of the bodywork of the vehicle.

10. In a device for adjusting the position in azimuth and in elevation of vehicle headlamps, each headlamp presents at one of the ends of its horizontal axis a swivel joint by which it is mounted on the bodywork of the vehicle and at its other end, the headlamp is mounted on a mobile element by means of two pivoting pins of which one lies in the horizontal axis and of which the other is offset with respect to the horizontal axis, said mobile element being mounted to slide horizontally on a suppport member fixed on the bodywork, a means for manually adjusting in azimuth being provided between the mobile element and the support member, said mobile element containing a means for adjustment in elevation controlled selectively by a manual member and a drive member, said means for adjustment in elevation driving the offset pin and the headlamp in rotation about its horizontal axis.

11. The device of claim 1, wherein the means for manually adjusting in azimuth is constituted by a screw presenting a flange mounted prisoner in free rotation in the support member and of which the threaded part is engaged in a nut mounted prisoner in a housing in the mobile element sliding horizontally with respect to the support member.

12. The device of claim 1, wherein the mobile element is constituted by a box closed by a lid and in which is slidably mounted a first slide block presenting a hole in which is pivotally mounted the pin offset with respect to the horizontal axis, said first slide block presenting a tapped hole in which is engaged the threaded part of a screw for manually adjusting in elevation, of which a flange is mounted in free rotation in a housing in a second slide block mounted to slide vertically in a guide in the box, said second slide block presenting a housing in which the first slide block is mounted to slide vertically, said second slide block presenting a tapped hole in which is engaged the threaded part of a shaft connected by a gear transmission to an electric motor.

* * * * *

UNITED STATES PATENT OFFICE
CERTIFICATE OF CORRECTION

Patent No. 4,674,013　　　　　　　　　Dated　June 16, 1987

Inventor(s) Stephane Manzoni

It is certified that error appears in the above-identified patent and that said Letters Patent are hereby corrected as shown below:

Column 2, line 30, after "supplying" insert ---- the ----.

Column 3, line 53, delete "FIG.1)" and insert ---- (FIG. 1) ----.

Column 5, line 45, delete "of" and insert ---- or ----.

In The Claims

Column 6, line 66, delete "art" and insert ---- arc ----.

Column 7, line 10, after "said" insert ---- first ----.

Column 8, line 33, delete "claim 1" and insert ---- claim 10 ----

Column 8, line 40, delete "claim 1" and insert ---- claim 10 ----

Signed and Sealed this

Twentieth Day of October, 1987

Attest:

DONALD J. QUIGG

Attesting Officer　　　　　　Commissioner of Patents and Trademarks